(12) United States Patent
Böe

(10) Patent No.: US 6,414,238 B2
(45) Date of Patent: Jul. 2, 2002

(54) METHOD OF FASTENING A SOLAR CELL TO A SUPPORT, ESPECIALLY A STRUCTURE

(76) Inventor: Hans Peter Böe, Speldorfer Strasse 17-19, D-46049 Oberhausen (DE)

( * ) Notice: Subject to any disclaimer, the term of this patent is extended or adjusted under 35 U.S.C. 154(b) by 0 days.

(21) Appl. No.: 09/808,399

(22) Filed: Mar. 14, 2001

(30) Foreign Application Priority Data

Mar. 22, 2000 (EP) .............................. 00106219

(51) Int. Cl.$^7$ ................ H01L 31/048; H01L 31/042
(52) U.S. Cl. ................ 136/251; 136/256; 136/259; 438/64; 438/57
(58) Field of Search .................. 136/251, 256, 136/259; 438/64, 57

(56) References Cited

U.S. PATENT DOCUMENTS

| 3,419,461 A |   | 12/1968 | Gebhard et al. |   |
| 5,763,090 A | * | 6/1998 | Boe | 428/426 |
| 6,015,622 A | * | 1/2000 | Boe | 428/426 |

FOREIGN PATENT DOCUMENTS

| DE | 296 22 732 U | 6/1997 |
| DE | 200 02 603 U | 6/2000 |
| EP | 0 790 370 | 8/1997 |

OTHER PUBLICATIONS

Patent Abstracts of Japan—abstract for JP 02–34588, Feb. 1990.
Derwent abstract 1974—68504V, XP–002144694, Feb. 1974.
"Torsionschwingungsversuch", DIN 53445; Ersatz fur Ausgabe 11.65 und DIN 53 520/01.69; (ISO537–1980 & ISO 4663–1984; 7 pages, Aug. 1986.

* cited by examiner

Primary Examiner—Alan Diamond
(74) Attorney, Agent, or Firm—Herbert Dubno

(57) ABSTRACT

A solar cell having a rear backing of a polyvinylfluoride foil is bonded by a mortar consisting of a finely divided neutral aggregate, a hydraulic cement and an aqueous dispersion of a polyacrylic acid derivative having a logarithmic decrement of torsional vibration damping with a maximum at a temperature below 0° C. to the surface of a building composed of concrete, to a porous glass or to a metal plate which is hung on a building.

16 Claims, 1 Drawing Sheet

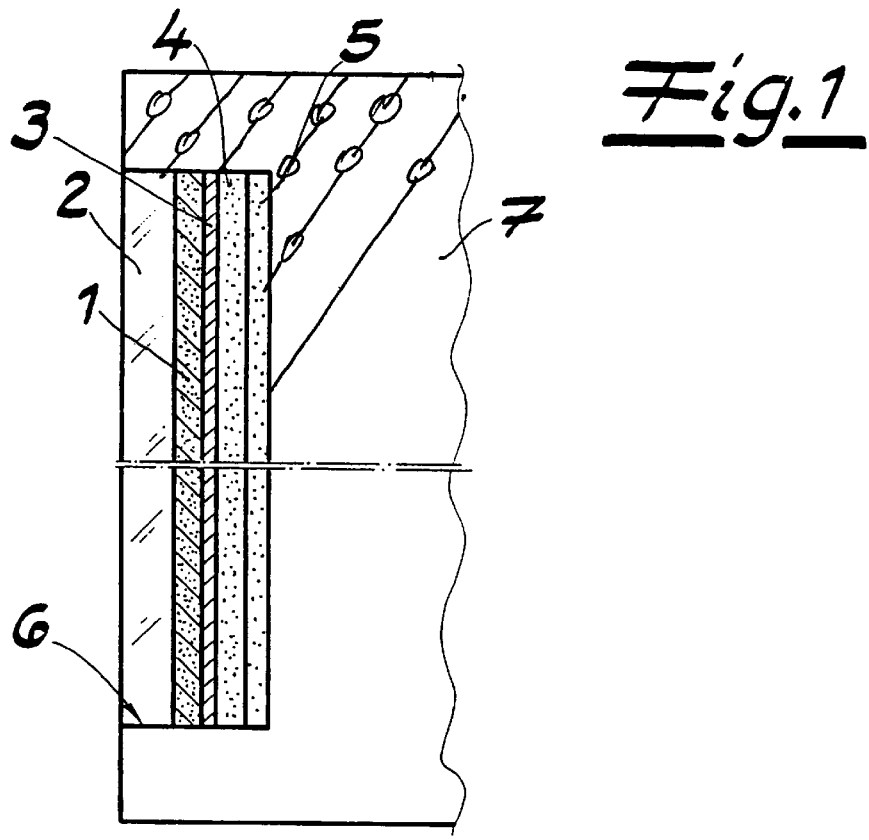
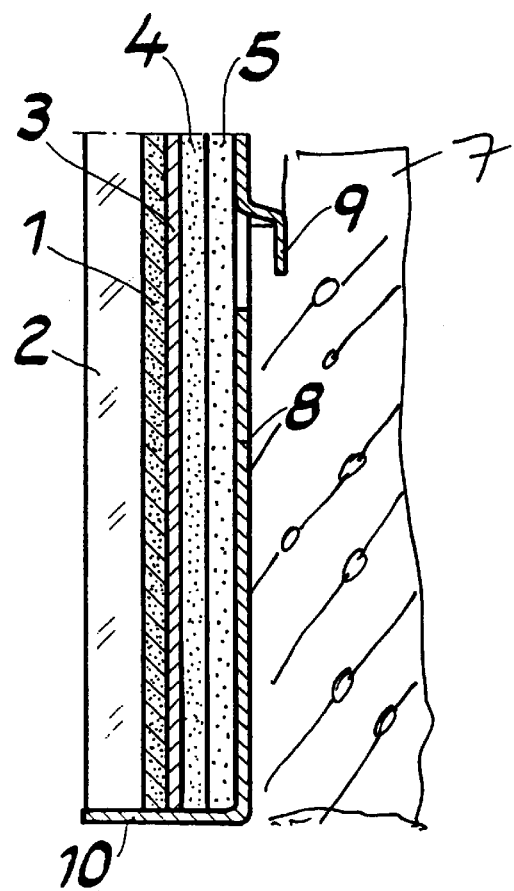

METHOD OF FASTENING A SOLAR CELL TO A SUPPORT, ESPECIALLY A STRUCTURE

FIELD OF THE INVENTION

My present invention relates to a method of fastening a solar cell to a support, especially a surface of a building structure. The invention also relates to a solar cell assembled on a building structure or the like and to a mounting system for a solar cell of the type which has a front glass plate and a rear backing in the form of a polyvinylfluoride foil.

BACKGROUND OF THE INVENTION

The art does not appear to describe any bonding agent or adhesive which is capable of satisfactorily bonding polyvinylfluoride foils to optional support surfaces of structure and the like, especially concrete structures, in a permanent manner. A number of solar cells do provide, however, backing layers of polyvinylfluoride foils. As a consequence, to mount such solar cells on building structures it has been the practice heretofore to secure the solar cells in a metal frame and then to mount this metal frame on the structure. This approach is relatively expensive.

EP 0 790 370 A discloses a bonding of a solar cell with a front glass plate by bonding a mortar layer which is composed of a finely divided neutral aggregate, cement (especially hydraulic cement) and an aqueous dispersion of a polyacrylic acid derivative in which the suspension serves to provide water for hydrating the hydraulic cement and aggregate mixture. The polyacrylic acid derivative has a logarithmic decrement of the torsional vibration damping, determined by the German Industrial Standard DIN 53445 (August 1986), which is a maximum at a temperature below 0° C. This bonding composition or mortar serves to secure the solar cell to a support surface by a rear glass plate which must be provided over the polyvinylfluoride foil or other foil structure of the solar cell. As far as I am aware, there has been no adhesive or other bonding agent described heretofore for securing the polyvinylfluoride foil directly to a support surface.

OBJECTS OF THE INVENTION

It is therefore the principal object of the present invention to provide an improved method of bonding the polyvinylfluoride backing foil of a solar cell to a support surface.

Another object of the invention is to provide a method of mounting a solar cell which is less expensive than earlier mounting methods and obviates drawbacks thereof.

A further object of the invention is to provide an improved solar cell assembly.

SUMMARY OF THE INVENTION

These objects are attained in accordance with the invention by a method of fastening to a support a solar cell having a front glass plate and rear backing of a polyvinylfluoride foil and which comprises the steps of:

(a) preparing a bonding composition from a hydraulic cement, a finely divided neutral aggregate and an aqueous dispersion of a polyacrylic acid derivative having a logarithmic decrement of torsional vibration damping, determined in accordance with German Industrial Standard DIN 53445 (corresponding to ISO 537-1980), having a maximum at a temperature below 0° C.;

(b) applying the bonding composition between the rear backing of polyvinylfluoride foil of the solar cell and a support surface; and (c) permitting the bonding composition to set, thereby bonding the polyvinylfluoride-foil backing of the solar cell to the support surface.

It is indeed surprising that this kind of mortar can bond not only glass but also polyvinylfluoride to surfaces like metal surfaces and concrete surfaces of a structure satisfying all of the requirements for mounting of solar cells in an exposed state. This was certainly not to be expected since, while both polyvinylfluoride and glass are practically impermeable to water vapor, they have vastly different compositions and structures.

In a preferred embodiment of the invention, the back side of the solar cell, i.e. the polyvinylfluoride foil, may be precoated with a hardened layer of a mortar composition which hardens by combination with water of hydration and under conditions of a water of hydration deficiency. Later with the aid of a fresh bonding mortar composition as described above, the deficiency layer and the polyvinylfluoride foil are bonded to the surface of the support which can be constituted of concrete and which may have a cassette-like recess in which the solar cell is seated for protection from external influences.

Solar cells based upon amorphous silicon have an efficiency which increases with the temperature. In a preferred embodiment, to insulate the solar cell and maintain an elevated temperature, the solar cell is secured in accordance with the invention on a glass foam substrate.

With solar cells of crystalline silicon, which have an efficiency which increases as the temperature is reduced, the solar cell can be secured to a sheet metal plate having a rearwardly bent tongue which enables the plate to be hung on the wall of a structure. The sheet metal plate to which the solar cell is bonded has a forwardly bent lip at an edge engaging below the solar cell. The finely divided neutral aggregate can have a grain size of 0.1 to 1 mm, preferably 0.2 to 0.7 mm. The cement can be a Portland cement.

The polyacrylic acid derivative can be a polyacrylate, especially an acrylic resin or a copolymer of polymers in which acrylonitrile is one of the comonomers. The water content of the dispersion serves as the water of hydration or setting the composition and for completing the hydration if necessary of the layer previously applied to the polyvinylfluoride foil.

BRIEF DESCRIPTION OF THE DRAWING

The above and other objects, features, and advantages will become more readily apparent from the following description, reference being made to the accompanying drawing in which:

FIG. 1 is a cross sectional view showing a first embodiment of a solar cell bonded to a support; and FIG. 2 is a cross sectional view of a second embodiment of the solar cell.

SPECIFIC DESCRIPTION

The solar cells 1 shown in FIGS. 1 and 2 have a front side formed with a glass plate 2 turned toward the sun and a rear backing foil of polyvinylfluoride as shown at 3.

The backing foil 3 of polyvinylfluoride can have a mortar layer 4 prebonded thereto and composed of a finely divided neutral aggregate, cement and an aqueous dispersion of a polyacrylate acid derivative which supplies make-up water for the composition. The polyacrylic acid derivative can be a polymer of acrylic acid, acrylates or acrylonitrile and may be a methacrylic acid polymer or copolymer which has a logarithmic decrement of the torsional vibration damping, determined in accordance with DIN 53445 which has a maximum at a temperature below 0° C. This mortar layer 4 is hardened with a deficiency of hydration water.

The layer 4 or the foil 3 directly is then bonded by a further mortar layer, also constituted of the finely divided neutral aggregate, the hydraulic cement and the aqueous dispersion of the polyacrylic acid derivative to the support 7. The mortar layer 5 is permitted to harden and can supply water of hydration in an amount to make up for the deficiency in the layer 4.

In the embodiment of FIG. 1, the solar cell is bonded in a cassette recess 6 of a building structure 7 of concrete. It is also possible to use foamed glass as the support. In the embodiment of FIG. 2 the solar cell 1 is bonded by the layer 5 of the mortar to a sheet metal plate 8 which is stamped with a rearwardly bent hanger tongue 9 with which the assembly of FIG. 2 can be hung from the structure 7. The sheet metal plate 8 has a forwardly bent lip 10 engaging below the lower edge of the solar cell.

The aggregate can be quartz sand or ground glass and in the composition, the finely divided aggregate, the cement and the aqueous dispersion of the polyacrylic acid derivative can each be present in an amount of 10 to 40% by weight with each being present in a preferred range of 25 to 35 weight percent. In a specific example, the aqueous dispersion is present in an amount of 35%, the Portland cement in an amount of 30% and the glass mail is present in an amount of 35%. The layers 4 and 5 can be of a thickness of 2 to 7 mm, preferably 4 to 6 mm.

I claim:

1. A method of fastening to a support a solar cell having a front glass plate and a rear backing of a polyvinylfluoride foil, said method comprising the steps of:
   (a) preparing a bonding composition from a hydraulic cement, a finely divided neutral aggregate and an aqueous dispersion of a polyacrylic acid derivative having a logarithmic decrement of torsional vibration damping, determined in accordance with ISO 537, having a maximum at a temperature below 0° C.;
   (b) applying said bonding composition between said rear backing of polyvinylfluoride foil of said solar cell and a support surface; and
   (c) permitting said bonding composition to set, thereby bonding said polyvinylfluoride-foil backing of said solar cell to said support surface.

2. The method defined in claim 1, further comprising the step of coating said polyvinylfluoride-foil backing of said solar cell with a layer of a hydration-water hardened substance, said layer of said hydration-water hardened substance having a hydration water deficiency and being later bonded to said support surface by the bonding composition by steps (a), (b) and (c).

3. The method defined in claim 2 wherein said support surface is formed by a concrete building structure, said support surface being formed with a recess, said solar cell being seated in said recess.

4. The method defined in claim 2 wherein said support surface is formed as a surface of a glass-foam structure and said polyvinylfluoride-foil backing of said solar cell is bonded to said glass-foam structure.

5. The method defined in claim 2 wherein said support surface is a surface of a sheet metal support, said method further comprising the step of bending a hanger tongue out of said sheet metal support and affixing said sheet metal support with said solar cell bonded thereto by said composition and said polyvinylfluoride-foil backing of said solar cell to a building structure by said hanger tongue.

6. The method defined in claim 5, further comprising bending a lip of said sheet metal support forwardly to engage said solar cell from below.

7. The method defined in claim 1 wherein said support surface is formed by a concrete building structure, said support surface being formed with a recess, said solar cell being seated in said recess.

8. The method defined in claim 1 wherein said support surface is formed as a surface of a glass-foam structure and said polyvinylfluoride-foil backing of said solar cell is bonded to said glass-foam structure.

9. The method defined in claim 1 wherein said support surface is a surface of a sheet metal support, said method further comprising the step of bending a hanger tongue out of said sheet metal support and affixing said sheet metal support with said solar cell bonded thereto by said composition and said polyvinylfluoride-foil backing of said solar cell to a building structure by said hanger tongue.

10. The method defined in claim 9, further comprising bending a lip of said sheet metal support forwardly to engage said solar cell from below.

11. A solar cell assembly comprising:
    a structure formed with a support surface;
    a solar cell having a front glass plate and a rear backing of a polyvinylfluoride foil; and
    a bonding composition from a hydraulic cement, a finely divided neutral aggregate and an aqueous dispersion of a polyacrylic acid derivative having a logarithmic decrement of torsional vibration damping, determined in accordance with ISO 537, having a maximum at a temperature below 0° C. bonding said polyvinylfluoride foil to said surface.

12. The solar cell assembly defined in claim 11, further comprising a layer of a hydration-water hardened substance between said foil and said surface.

13. The solar cell assembly defined in claim 11 wherein said support surface is formed by a concrete building structure, said support surface being formed with a recess, said solar cell being seated in said recess.

14. The solar cell assembly defined in claim 11 wherein said support surface is formed as a surface of a glass-foam structure and said polyvinylfluoride-foil backing of said solar cell is bonded to said glass-foam structure.

15. The solar cell assembly defined in claim 11 wherein said support surface is a surface of a sheet metal support having a hanger tongue bent out of said sheet metal support and affixing said sheet metal support with said solar cell bonded thereto by said composition and said polyvinylfluoride-foil backing of said solar cell to a building structure by said hanger tongue.

16. The solar cell assembly defined in claim 15, further comprising a lip of said sheet metal support bent forwardly to engage said solar cell from below.

* * * * *